June 2, 1959  J. WARREN  2,889,016
CHASSIS CONSTRUCTION STRIP AND A CHASSIS
Filed April 13, 1955
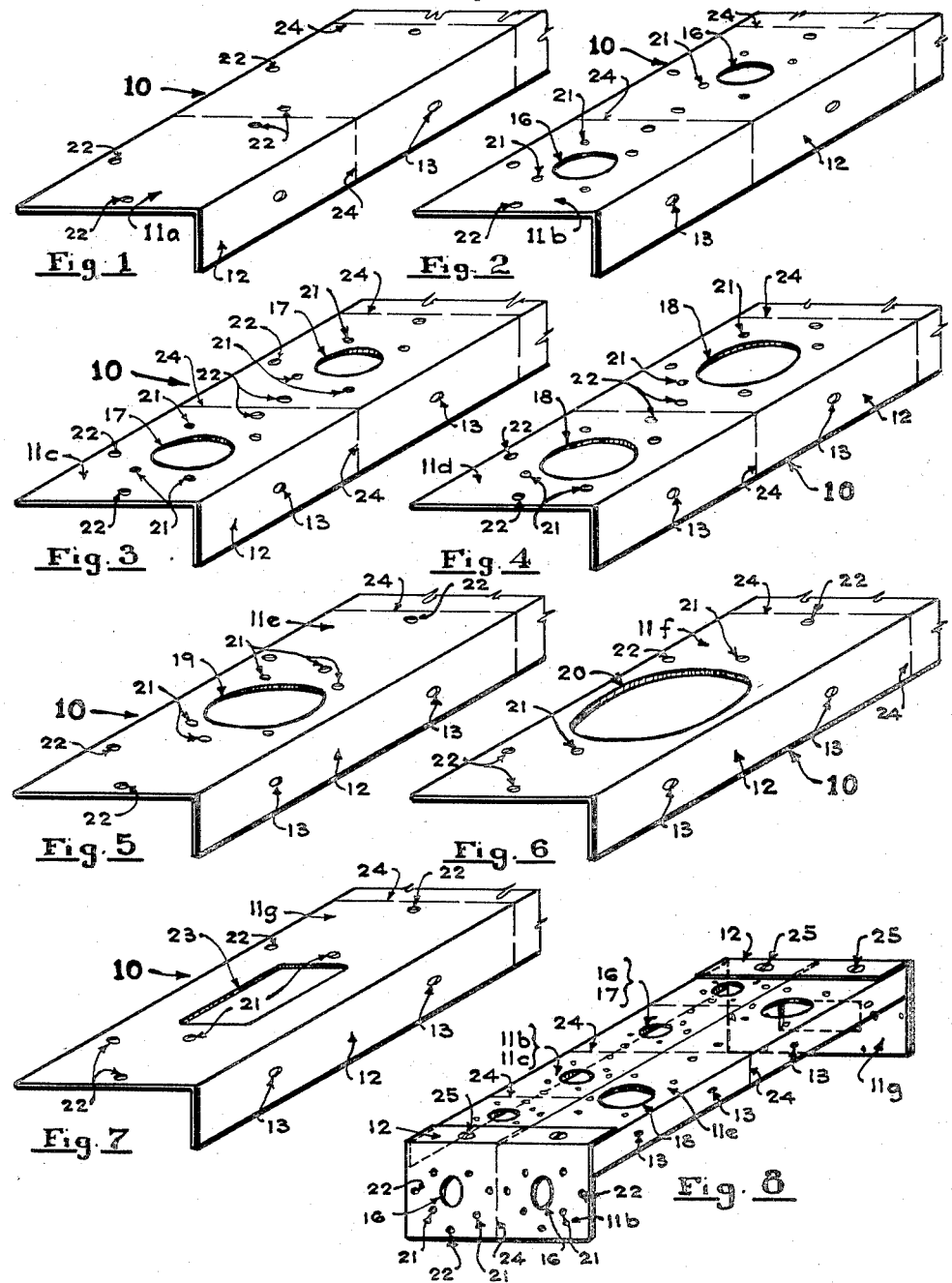
INVENTOR.
Jack Warren
BY
Bohleber, Fassett & Montstream
ATTORNEYS United States Patent Office 2,889,016
Patented June 2, 1959

2,889,016

CHASSIS CONSTRUCTION STRIP AND A CHASSIS

Jack Warren, River Edge, N.J.

Application April 13, 1955, Serial No. 501,118

9 Claims. (Cl. 189—34)

The invention relates to a chassis construction strip by means of which a chassis may be built up or assembled into various desired sizes and shapes. The invention also relates to the chassis made from chassis construction strips or parts thereof. Each chassis construction strip or strips has a plurality of spaced weakening courses thereacross which weakens the strip at predetermined lengths dividing the strip into a plurality of units. By bending the strip at a weakening course one or more units may be detached therefrom and assembled together to form a chassis for some piece of electrical of electronic equipment.

It is an object of the invention to construct a chassis construction strip having a flange at one edge thereof and weakening courses across the strip including the flange at spaced locations thereby dividing the same into units so that a strip may be easily divided by bending into parts of one or more units. Parts of several construction strips of one or more units or full length strips may be assembled together to form a chassis with mounting holes therethrough to receive a piece or pieces of electrical or electronic equipment.

Another object is to construct chassis strips with separable units of different but proportional lengths which can be assembled together into a chassis.

Another object is to construct a chassis which is easily and cheaply built up to a desired size by using the chassis construction strips or separable parts thereof.

Other objections of the invention will be more apparent from the following description when taken in connection with the accompanying drawing illustrating a preferred embodiment thereof in which:

Figure 1 is a perspective view of a portion of a chassis construction strip which is plain in that it carries connecting holes only therein and is better suited for forming the sides or legs of a built-up chassis;

Figure 2 is a perspective view of a portion of a chassis construction strip having relatively small mounting holes therethrough at spaced intervals;

Figures 3 and 4 are perspective views of portions of chassis construction strips having somewhat larger mounting holes through the panel portion particularly for receiving sockets for electronic tubes;

Figure 5 is a perspective view of a portion of a chassis construction strip having still larger mounting holes through the panel portion suitable for larger electrical or electronic parts;

Figure 6 is a perspective view of a portion of a chassis construction strip having larger mounting holes therethrough for receiving still larger pieces of equipment;

Figure 7 is a perspective view of a portion of a chassis construction strip having rectangular mounting holes therethrough to receive or mount pieces of equipment of this shape; and Figure 8 is a perspective view of a chassis which has been built up by utilizing some of the units or lengths of the construction strips illustrated in Figures 1 through 7.

The chassis construction strips 10 are angular in form having relatively wide panel portions 11a, 11b, 11c, etc. for forming a leg or side of a built-up chassis or forming the panel of the chassis for receiving or mounting pieces of electric or electronic equipment or components. A relatively narrow connecting portion or flange 12 extends along the edge and preferably extends continuously along the entire length of one long edge of each construction strip. It has spaced connection holes 13 therethrough for receiving a connecting or securing means. This flange may be a connecting flange as will appear more fully hereinafter and also gives stiffness to the panel portion. For example the construction strips may be bent from a ribbon of metal two inches wide with a panel portion width of 1½ inches wide and a flange ½ inch wide. Aluminum is a suitable metal.

The panel portion of the construction strips may be plain as in Figure 1 or have various sizes or types of mounting holes therethrough at spaced intervals as in Figures 2 through 7. The mounting holes receive or mount some particular piece of electronic or electrical equipment. Preferably, each strip has but one size or type of mounting hole in the panel portion uniformly spaced from each other lengthwise of the strip. The mounting holes shown are round in the strips of Figures 2 through 6 and of different sizes. The hole 16, being small, is adapted to receive such parts as a potentiometer, phone plug, a switch and the like. The mounting holes 17 and 18 of Figures 3 and 4 are larger than hole 16, and mounting hole 18 is larger than 17. These mounting holes are suitable for receiving parts such as tube sockets of different sizes. Mounting hole 19 of Figure 5 is larger still and suitable for such parts as a larger tube socket, small condenser wafer and the like. Hole 20 of Figure 6 is a mounting hole of still larger diameter suitable for such parts as a large condenser wafer and an output transformer. A rectangular mounting hole 23 shown in the construction strip of Figure 7 receives such parts as a lug strip or switch for connection with a power source. The mounting holes are selected to be of the same approximate size and shape as that of a part to be received therein.

Two or more securing holes 21 are disposed around each mounting hole through which a securing means such as a screw, bolt, rivet and the like passes for securing a part in position upon the strip and in or in alignment with the hole. At least one connecting hole 22 is located adjacent the longitudinal edge other than the edge carrying the connecting portion and preferably centrally of a short unit. A connecting hole for each unit is provided as well centrally along the edge of each weakening course. Such additional connecting holes increase the adaptability of the strip or strips for the construction of various sizes of chassis.

The chassis construction strip is relatively long so as to provide a plurality of spaced weakening courses 24 extending across the width thereof, that is, across the panel portion and the connecting portion or flange. Each strip includes, therefore, a plurality of units connected together, the courses forming the end edges of each unit. One or more units may be readily bent off or severed from any strip by bending at a weakening course. Strips of two different lengths of units are shown in which each unit of the strips of Figures 5, 6 and 7 is twice the length between course 23 of the unit of construction strip of Figures 1 through 3 inclusive. The construction strips may have any number of units thereon such as six for the strips of Figures 1 through 4 having shorter units and the construction strips having longer units, as shown in Figures 5, 6 and 7, may have three such units for each strip. The length of a strip between courses 23 is a unit and by having the longer units of Figures 5–7 twice the length of the shorter units, it is simple to combine lengths of short and long units in making a chassis. The length of the shorter unit is the same as the width of the panel portion of strips of both long and short units. The length of the longer units therefore is the same as the width of two construction strips. Longer length units may also be provided if desired. It will be noted therefore that the length of the shorter unit is the same as the width of the panel portion of the construction strip or a proportionality of 1 to 1. The longer units have a length twice the width of the panel portion or a proportionality of 2 to 1.

In the illustrated assembled chassis of Figure 8, two strips are used for the panel of the chassis, one of four shorter units and one of two longer units in side by side relation. A two unit length of construction strip of the type of Figure 1 forms one side or leg of the built up chassis which suports one end of the panel above the table top. A single unit length of construction strip of the longer form of Figure 7 has been broken off at a weakening course and connected with the opposite side or end of the chassis. The flange or connecting portion is placed in contact with the top face of the panel construction strips 11b or 11c and 11e and securing means, such as bolts, rivets, self threading screws 25 or the like, pass through each connecting hole 13 in the flange and the connecting hole 22 adjacent the end edge of each panel portion to secure them together and the two panel strips together. A one unit part such as that of the strip of Figure 7 has been separated from its strip at a weakening course and assembled in the same manner to the other end of the chassis to form the side or leg at this end. This side is adapted to receive a switch or lug strip. The panel portions forming the panel shown in the chassis of Figure 8 are held together solely by being secured to the sides 11b and 11g.

It is clear that that the strips may be one or more units long whereby a chassis of any desired length may be made. Similarly if it is desired to have a panel more than two strips wide, in that event the connecting portion or flange of a third strip may be secured to the flange of the adjacent strip by suitable securing means or the three strips forming the panel may be secured together solely by a connected three-unit construction strip at each end and passing securing means through the connecting hole 22 in the flange and in the edge of the third strip. Any width and length of chassis may be built up. It is clear if the panel strips have their connecting flanges together that similarly the long sides or edge of the chassis may carry the legs on sides of the chassis. Likewise, short length units may be used on the long edges as well as at the ends if it is desired to mount additional parts upon the chassis. Other variations may be made and are apparent.

The invention is presented to fill a need for improvements in a chassis construction strip and a chassis. It is understood that various modifications in structure, as well as changes in mode of operation, assembly and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A chassis construction strip comprising a strip having a panel portion, a relatively narrow connecting portion forming a flange extending the length of the strip along at least one edge of the panel portion, a plurality of spaced weakening courses extending across the panel portion and connecting portion thereby dividing the strip into units selectively separable from the strip whereby the panel portion may be any desired number of units in length integrally connected together, each unit of the panel portion having at least one relatively small connecting hole adjacent at least one edge thereof, and the connecting portion of each unit having at least one connecting hole therethrough located in matching position with respect of the connecting hole in the panel portion for cooperation with a connecting hole in a panel portion of another unit.

2. A chassis construction strip as in claim 1 in which each unit of the panel portions has a mounting hole therethrough and centrally thereof, and has at least one relatively small securing hole adjacent the mounting hole for receiving a securing means.

3. A chassis construction strip as in claim 1 including at least one connecting hole adjacent three edges of each unit of the panel portion other than the edge of the connecting portion and located in matching position with the connecting hole in the flange.

4. A chassis construction strip as in claim 1 in which the length of a unit is proportional to the width of the panel portion of the construction strip.

5. A chassis construction strip as in claim 4 in which each unit has a length the same as the width of the panel portion of the strip.

6. A chassis construction strip as in claim 4 in which each unit has a length twice the width of the panel portion of the strip.

7. A built up chassis comprising a panel of at least one unit of a chassis construction strip and having end edges; the construction strip including a strip having a panel portion, a relatively narrow connecting portion forming a flange extending the length of the strip along at least one edge of the panel portion, a plurality of weakening courses extending across the panel portion and connecting portion thereby dividing the strip into units separable from the strip, at least one panel portion having a mounting hole therethrough and centrally thereof, each panel portion with a mounting hole having at least one small securing hole adjacent the mounting hole, each unit of the panel portion having at least one relatively small connecting hole adjacent at least one edge thereof, and the connecting portion of each unit having at least one connecting hole therethrough located for cooperation with a connecting hole in a panel portion of another unit; a side secured to at least the end edges of the panel, each side being at least one unit of a construction strip with the connecting portion engaging the panel, and means in the connecting holes securing each side to each construction strip of the panel.

8. A built up chassis comprising a panel of a plurality of chassis construction strips of at least one unit length in side by side relationship and having edges; the construction strip including a strip having a panel portion, a realtively narrow connecting portion forming a flange extending the length of the strip along at least one edge of the panel portion, a plurality of weakening courses extending across the panel portion and connecting portion thereby dividing the strip into units separable from the strip, at least one panel portion having a mounting hole therethrough and centrally thereof, each panel portion with a mounting hole having at least one small securing hole adjacent the mounting hole, each unit of the panel portion having at least one relatively small connecting hole adjacent at least one edge thereof, and the connecting portion of each unit having at least one connecting hole therethrough located for cooperation with a connecting hole in an edge of the panel portion of another unit; a side secured to at least opposite edges of the panel, each side being at least one unit of a construction strip with its connecting portion engaging the panel, and means in the connecting holes of the sides and panel securing each side to at least one construction strip of the panel.

9. A built up chassis as in claim 8 in which the sides are connected to the end edges of each construction strip forming the panel portion to secure the latter together.

References Cited in the file of this patent

UNITED STATES PATENTS

| | | |
|---|---|---|
| 1,242,892 | Wagner | Oct. 9, 1917 |
| 1,728,893 | Langsner | Sept. 17, 1929 |
| 1,820,660 | Gilbert | Aug. 25, 1931 |
| 1,917,764 | Howie | July 11, 1933 |
| 2,178,220 | Blancha | Oct. 31, 1939 |
| 2,343,284 | Dodington | Mar. 7, 1944 |
| 2,412,558 | Blank | Dec. 17, 1946 |
| 2,483,560 | Peterson | Oct. 4, 1949 |
| 2,544,266 | Kennedy | Mar. 6, 1951 |